United States Patent [19]

Fonseca

[11] 4,030,917
[45] June 21, 1977

[54] HYDROMETALLURGICAL PROCESSING OF METAL SULFIDES

[75] Inventor: Anthony G. Fonseca, Ponca City, Okla.

[73] Assignee: Continental Oil Company, Ponca City, Okla.

[22] Filed: Nov. 12, 1975

[21] Appl. No.: 631,015

[52] U.S. Cl. .................................. 75/103; 75/117; 75/119; 204/117; 423/27; 423/32
[51] Int. Cl.² ........................................ C22B 15/10
[58] Field of Search ............... 75/117, 103, 119; 204/117; 423/27, 32

[56] References Cited

UNITED STATES PATENTS

| | | | |
|---|---|---|---|
| 2,727,819 | 12/1955 | Kenny et al. | 75/103 |
| 2,822,263 | 2/1958 | Forward | 75/117 |
| 3,817,743 | 6/1974 | Sardisco | 75/117 X |
| 3,891,522 | 6/1975 | McKay et al. | 204/108 |
| 3,933,478 | 1/1976 | Moore | 75/101 R |

Primary Examiner—G. Ozaki
Attorney, Agent, or Firm—Cortlan R. Schupbach, Jr.

[57] ABSTRACT

A low pressure, low temperature, hydrometallurgical process for the recovery of metal values from chalcopyrite and other metals and other metal sulfides. The process provides for all sulfur recovery as sulfuric acid and is nonpolluting, uses no neutralizing agents, and produces no waste products.

5 Claims, 1 Drawing Figure

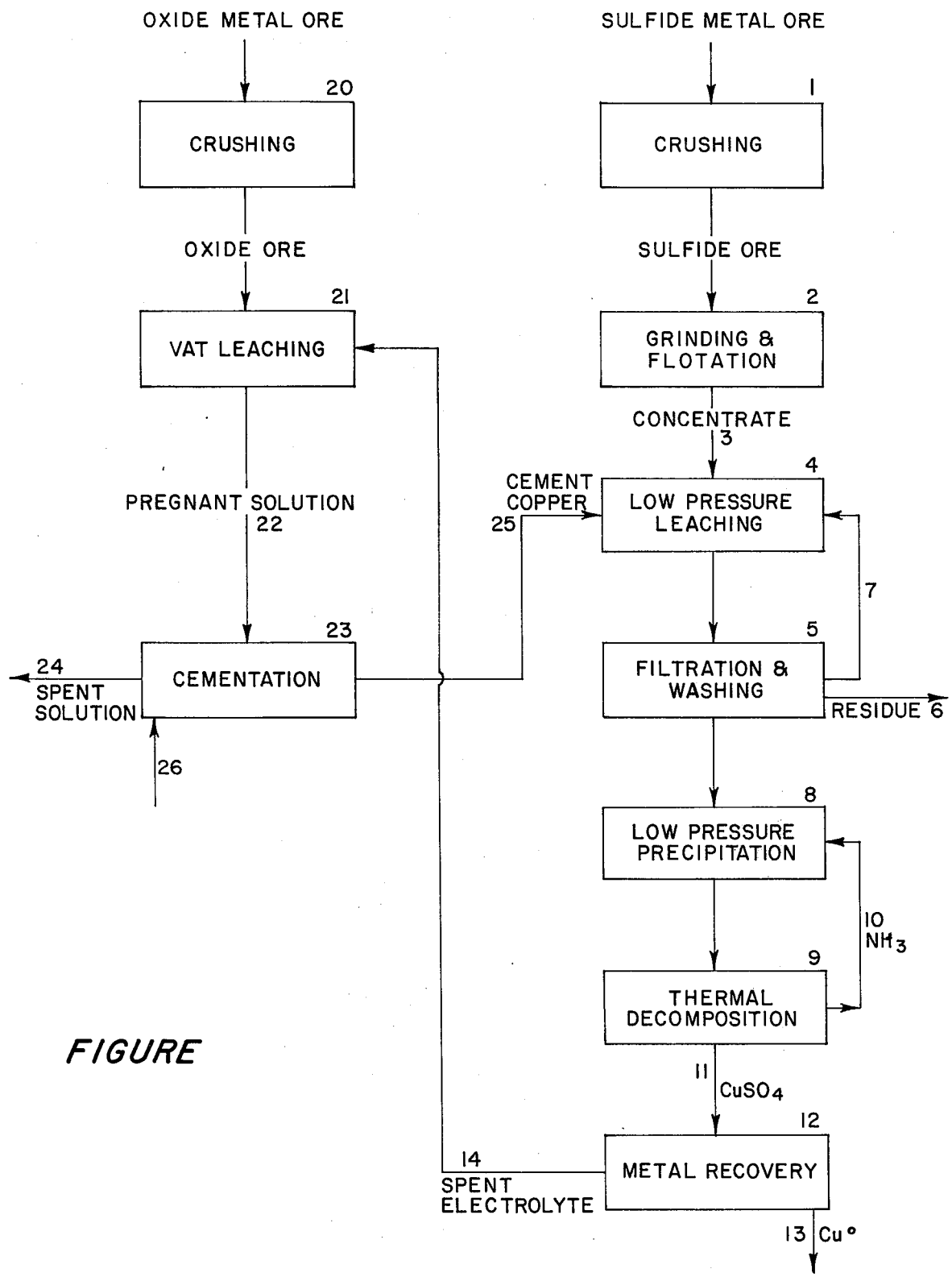
*FIGURE*

HYDROMETALLURGICAL PROCESSING OF METAL SULFIDES

This invention relates to a method for the hydrometallurgical recovery of metal values from sulfides. More particularly, this invention relates to a nonpyrometallurgical, nonpolluting process for the recovery of metal values from sulfides and other metal-containing materials. The invention describes a recycle system which is adaptable to both small and large processing systems.

Pyrometallurgical processes have long been the preferred method of separating metal from sulfide ores. Such methods require only oxygen and heat, producing sulfur containing gases. Such gases have long been disposed by venting to the atmosphere. Present environmental considerations have required that such gases be disposed in other manners, leading to greatly increased costs. As a result, hydrometallurgical methods are being widely used to recover metals. Such hydrometallurgical methods also have disadvantages in that each material used in the process must be recovered, recycled, or disposed at some point in the process.

The most widely used hydrometallurgical method of recovery of copper from low grade oxide ores is leaching the ore with sulfuric acid. This leaching may be carried out using dump, heap, and vat leaching processes. The leaching of a dump with sulfuric acid can take many months or even years to complete so that recovery is lengthy, expensive, and difficult at best. Although sulfuric acid leaching is relatively inexpensive when compared to other oxide ore treating methods, such a method frequently presents the problem of undesirable precipitation of hydrous iron and aluminum compound precipitates, leading to plugging of the heap or column of ore being leached. Recent efforts to obtain maximum recovery of copper from low grade dumps and other source materials low in copper content has prompted many recent studies of leaching and hydrometallurgical methods with the objecting of optimizing recovery from such sources. A summary of such studies can be found in "Current Copper Leaching Practices" in *Mining Engineering*, August, 1974, pages 58 through 60 and in "Trends in Copper Hydrometallurgy" in *Chemical and Process Engineering*, January, 1970, pages 65 through 68.

The patent literature also teaches many methods for such extraction. U.S. Pat. No. 3,322,532 proposes leaching low grade copper containing ores with an aqueous solution of sulfuric acid containing ammonium sulfate. The product solution containing copper sulfate is then treated with a polysulfide compound to precipitate copper sulfide. The sulfide is then converted to copper oxide by roasting which is in turn smelted to yield metallic copper.

Liquid-liquid ionic change extraction is proposed in U.S. Pat. Nos. 3,224,873; 3,284,501; and 3,428,449. As described in these patents, copper values from pregnant aqueous leach solutions are retained by liquid-liquid ion exchange extraction in which certain organic water immiscable extractants are utilized for extracting the copper from such leach solutions. Efficient extraction can be had only at relatively high pH (above about 3). In U.S. Pat. No. 3,428,449, the advantage of carrying out the liquid-liquid ion extraction of acidic low pH leach solutions is described. The patentee points out that other previously known extractants which operate effectively in extracting copper at leach solutions only at relatively high pH encounter a problem in that the leach solution contains substantial quantities of iron and that this higher pH results in precipitation of iron compounds presenting removal difficulties. Therefore, it is often necessary to provide equipment and sustain certain additional material costs by adding lime or other pH elevating material to adjust the pH of the leach solution upward in order to permit certain extractants to operate effectively.

U.S. Pat. No. 3,440,036 indicates that the copper can be effectively extracted from copper-bearing ammonium persulfate solutions by using an alpha hydroxyoxime extractant at a pH of from 5.5 to 7.5. Other methods are also known in the art.

There is also much interest in processing methods for some of the complex ores containing one and especially more than one metal values which cannot be processed economically by pyrometallurgical methods.

Recent advances have been made in the field concerning the ammonia-oxygen leaching of metal sulfides. However, the technical and commercial systems for using ammonia all have a serious drawback. Some or all of the sulfur values must be removed as nonusable gypsum or economically undesirable ammonium sulfate. Manufacturers must purchase lime in order to make gypsum. Also, additional sulfuric acid must be purchased for oxide ore processing that is or would be disposed of as gypsum. Thus,

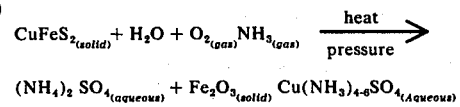

$$CuFeS_{2_{(solid)}} + H_2O + O_{2_{(gas)}} NH_{3_{(gas)}} \xrightarrow[\text{pressure}]{\text{heat}}$$
$$(NH_4)_2 SO_{4_{(aqueous)}} + Fe_2O_{3_{(solid)}} Cu(NH_3)_{4-6} SO_{4_{(Aqueous)}}$$

It is therefore desirable that total recovery of all sulfur values and all metallic values be available in a process which is adaptable to a variety of sulfide ore and metal-containing materials or scrap and is also adaptable for complex ores for small as well as large size operations.

It is therefore an object of the present invention to develop a nonpolluting process which will recover all sulfur values from a sulfide ore at low temperatures, low pressures and without additional chemical reagents. Other objects will become apparent to those skilled in this art as the description proceeds.

It has now been discovered according to the present invention that the addition of nonsulfide material in the low pressure, low temperature leaching of metal sulfides in aqueous basic systems allow the recovery of all sulfur values as sulfuric acid from electrowinning or hydrogen reduction. No additional chemicals such as lime need be used. In addition, the iron oxides residue can be reduced to provide the iron used to generate the nonsulfide material.

The FIGURE shows in schematic form the recovery of copper from sulfide metal ores using the process of the instant invention, whereby low pressures and temperatures allow the recovery of all sulfur values as sulfuric acid while recovering metal values from metal sulfide ores such as chalcopyrite.

Generally, pressures of from about 1 to about 350 pounds per square inch gauge (psig) partial oxygen pressure can be used. Pressures of from 10 to 25 psig partial pressure oxygen are preferred. Total reactor pressures will normally be from 1 to 500 psig, although 90 to 150 psig are preferred. Temperatures in the range of from 60° to 170° C can be used although from 90° to 150° C are preferred and from 100° to 125° C are most preferred. Shorter reaction times are obtained when the process is carried out at higher temperatures and pressures within the range. Pressures and temperatures interact to produce the reaction times necessary to carry out the present invention. As temperature increases, ammonia partial pressure and reaction speed increases. The time necessary to carry out a process of the present invention, as stated above, will depend upon the temperatures and pressure used. In addition, more than one stage can be used; for example, three or more. Each stage recovering successively less of the metal values and the sulfur values.

The process of the present invention should be carried out at a pH from neutral to basic. PH is not critical to the present invention so long as the pH is kept above 7.0.

The mol ratio of metal to sulfur must be at least 1 to 1. However, a slight excess metal is preferred to prevent any nondesirable (metal) sulfates from forming. From 2 to 4 mols of ammonia per mol of metal will generally be present during the reaction of the present invention. However, an excess amount of ammonia is not detrimental to the reaction, but necessitates excess ammonia removal from the product. A ratio of from 1.0 to 1.5 mols of metal per mol of sulfur is thus preferred.

Leaching solutions useful in the present invention are those such as ammonium sulfide, gaseous ammonia, ammonium bisulfate, ammonium sulfate, ammonium acetate, and the like. Since all values not included in the product must be recovered or disposed, gaseous ammonia is highly preferable over others which would be effective in the leach itself.

Any recoverable metal value can be used in the process of the present invention. Representative examples are nickel or copper ores, nickel or copper scrap, zinc ores, cobalt ores, and other ores normally recoverable from such processes. The ores are preferrably finely divided, since slower reaction rates are found with larger particle ores. Of these ores, copper ore is a preferred ore and the method is a preferred method for the recovery of copper and sulfur from the ores.

The reaction should be carried out in a low pressure reactor, preferably of stainless steel, or alternatively, lined with glass, titanium or some other noncorrosive material. Should a reactor material subject to corrosion be used, the reaction of the present invention will weaken and destroy the reactor over a period of time.

The reaction can be generally described by the equations set forth below. The reaction is described with reference to the preferred copper process but it must be understood that any other recoverable metal values such as nickel or cobalt can be substituted for copper with beneficial results.

Equation 1 shows the generalized leaching process utilizing cement copper (shown here for reaction purposes as $Cu_4Fe$ although it has no "formula" as such and the leaching of copper values from a typical copper sulfide ore chalcopyrite ($CuFeS_2$) in the presence of an ammonia system. Cement copper is made by placing an iron scrap or other source of elemental iron into an acidic solution of $CuSO_4$ and allowing oxidation of iron and reduction of the copper ion to take place. Copper scrap can also be utilized although the rate of reaction seems to be somewhat slower.

EQUATION 1

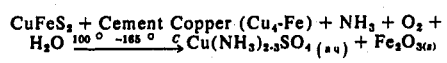

The iron oxide obtained is then reacted with carbon in the presence of heat (nonoxygen roasted) to yield an iron powder and various carbon oxides as shown in Equation 2. The iron powder can then either be sold or reused to form further cement copper.

EQUATION 2

Use Fe Powder for cement Cu production.

After all the metal sulfides have reacted, the iron oxides are filtered and washed from the reaction mixture. Many reactions are feasible to recover copper and sulfur values for end use. Three well-known reactions are shown in Reactions 3, 4, and 5 below wherein copper is recovered from $CuSO_4$. Many methods for continued processing and recovery can be used such as ammonia pressure precipitation, hydrogen reduction of solution, or solution evaporation. Such methods are set forth in Equations 3, 4, and 5.

EQUATION 3

$Cu(NH_3)_{2-4}SO_{4(aq)} \xrightarrow{H_2} Cu° (NH_4)_2SO_4$ (Uses lime for $NH_3$ recovery or sale of $(NH_4)_2SO_4$)

EQUATION 4

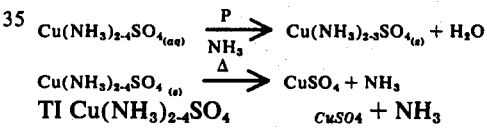

$CuSO_4$ to Cu recovery (Electrolysis, $H_2$ reduction, etc.)

EQUATION 5

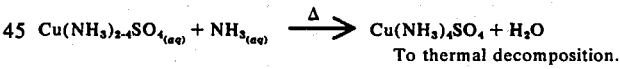

To thermal decomposition.

A diagram of the entire process is shown in the FIGURE. The ore is placed in a sulfide ore crusher, 1, and then passed in a more finely divided state to a grinding and flotation process, 2, from whence a concentrated ore, 3, is sent to a low pressure leaching process, 4. Cement copper is fed into the low pressure leaching process through a line, 25. Following the leaching, the leach product goes through a filtration and washing step, 5, wherein the ammonia wash solution is recycled through line 7 back through the low pressure leach. Iron oxides are removed as residue through line 6. Such iron oxides can of course be used to produce more cement copper and would comprise about 20% of the total process requirement. The aqueous solution is then passed to a low pressure precipitation, 8, where it is combined with ammonia coming off through line 10 from the thermal decomposition unit, 9. Alternatively, the material is subjected to water removal by utilizing the exothermic heat produced by the sulfide oxidation step with or without additional heat provided. The product of the thermal decomposition is copper sulfate which passes through line 11 to a process such as electrowinning, 12. From electrowinning sulfuric acid passes through line 14 to vat leaching, Section 21. Copper metal is precipitated, 13, and recovered. Simultaneously, oxide ore is passed through an oxide ore crusher, 20, and then to a vat leaching process, 21, producing a pregnant solution, 22, which goes into a copper cementation reactor, 23. Spent solution is expelled through line 24 and fresh iron is added through line 26. The product of the reaction, cement copper, goes through line 25 to the low pressure leach, 4.

The invention is more concretely described with reference to the examples below wherein all parts and percentages are by weight unless otherwise specified. The examples are intended to illustrate the present invention and should not be construed to limit it.

EXAMPLE 1

Concentrated chalcopyrite (2.52 percent copper, 29.5 percent sulfur) in the amount of 150 grams was mixed with 58 grams of cement copper (78.3 percent copper), added to 100 grams of water and 550 grams of ammonium hydroxide (25.4 percent $NH_3$) in an autoclave reactor. The total mixture was heated to 70° C under agitation. When 70° C was reached, 15 to 20 pounds per square inch gauge oxygen pressure was applied. The total reaction vessel pressure was 100 psig. An exothermic reaction commenced which was controlled by oxygen availability, dependent on the vapor pressure of ammonia solution (ammonia consumption temperature). The temperature was 120° C after 35 minutes. After 1 hour and 50 minutes, the reactor temperature had dropped to 108° C while oxygen pressure was maintained at the 15 to 20 psig. After cooling and filtration, 650 grams of product solution was obtained, containing 4.51 weight percent copper.

EXAMPLE 2

Chalcopyrite (porphyry concentrate) containing 25.2 percent copper and 29.5 percent sulfur (250 grams) was mixed with 312 grams of ammonium hydroxide (25.4 percent $NH_3$) and 212 grams of water to form a 32.3 percent slurry in an autoclave. The autoclave was stirred at 1500 revolutions per minute (rpm). The total pressure throughout the reaction was 100 pounds per square inch gauge, including oxygen which was maintained at a partial pressure of 15 to 20 psig. The total reaction mixture was heated to 70° C to commence the exothermic reaction.

The solution from the reaction had a pH of 7.57 and a weight of 646 grams. The increase in reactor temperature was provided by the exothermic reaction which in turn was governed by the limited oxygen supply. The $NH_3$ vapor pressure was decreased due to ammonia consumption as shown in Table I.

The residue from the reactor was reacted with ammonia and water under 100 psig total pressure containing 15 psig total oxygen partial pressure. The temperature at the conclusion of the reaction (about 2 hours) was 135° to 140° C. The residue (weight 128 grams) contained 5.89 grams of copper. The 2-stage low pressure reactant dissolved 90.7 percent of the copper from the porphyry concentrate. The first stage returned 44.18 grams of copper (70.12 percent) and the second stage 12.93 grams of copper (20.52 percent). Residue is mainly iron oxide together with a small amount of unreacted chalcopyrite.

The results are shown in the Table below:

TABLE I

| Time (Min) | Temp (° C) | Total Pressure (psig) | $O_2$ Pressure (psig) |
|---|---|---|---|
| 0 | 70 | 100 | 88 |
| 5 | 100 | 100 | 15 |
| 10 | 117 | 100 | 15 |
| 25 | 138 | 100 | 15 |
| 50 | 144 | 100 | 15 |
| 80 | 157 | 100 | 15 |
| 95 | 158 | 100 | 15 |
| 120 | 150 | 100 | 15 |
| 130 | 143 | 100 | 15 |

Solution from reaction, pH 7.57, wt 646 g.

EXAMPLE 3

The procedure of Example 2 was repeated except 125 psig total pressure and 15 psig total oxygen partial pressure was maintained. The higher operating pressure generally allowed an 8 to 15° C higher operating range.

The first stage reaction produced 642 grams of filtrate containing 6.96 weight percent copper at a pH of 7.24, which dissolves 70.92 weight percent of the available copper. The second stage reaction at the end of two hours produced 17.3 grams of dissolved copper (27.5 percent). The residue weight was 116 grams after the second stage. The total copper dissolved by solution analysis was 98.4 percent while the copper dissolved by the residue analysis was 96.5 percent. Clearly, a two-stage low pressure (total in oxygen) reaction can recover from about 96 to 98 percent of the copper contained in a porphyry concentrate.

EXAMPLE 4

Five grams of an Arizona porphyry ($CuFeS_2$) concentrate mixed with two grams of cementation copper (78.4 weight percent copper) in 30 grams of ammonium hydroxide (25.4 weight percent $NH_3$) and 20 grams of water was pressured with oxygen and stirred at 100° C in an autoclave. The total operating pressure was 100 psig during a reaction time of two hours. The reaction product was cooled, filtered, and washed with a 1 percent $NH_3$ solution. The filtrate contained 4.69 weight percent copper, 6.40 weight percent $SO_4$ and a ratio of copper to $SO_4$ of 1.11 to 1. Using a one-stage reactor, 70.1 weight percent of copper was recovered from this reaction solution.

EXAMPLE 5

The Arizona porphyry concentrate ($CuFeS_2$) described above was mixed with 30 grams of $NH_4OH$ (25.4 weight percent $NH_3$) and 20 grams of water. The mixture was pressurized to 100 psig total pressure with oxygen at a reaction temperature of 100° C for two hours. The reactant was filtered and the filtration was then mixed with two grams of cementation copper (a slight stoichiometric excess) and then allowed to react for two hours at 100° C and 100 psig total pressure with oxygen. The mixture was filtered. The filtrate containing 5.36 weight percent copper and 7.82 weight percent $SO_4$. The ratio of copper to $SO_4$ was 1.04 to 1. This two-stage reaction showed 85.6 weight percent copper recovered.

EXAMPLE 6

Cementation copper (78.3 weight percent) was mixed with a stoichiometric amount (8.13 grams) of (NH$_4$) SO$_4$, twenty grams of NH$_4$OH (25.4 weight percent NH$_3$), and twenty grams of water. The reaction mixture was allowed to react in a stirred reactor at 100° C for two hours with oxygen at a total pressure of 100 psig. The reaction mixture was cooled, filtered, and washed with 1 percent NH$_3$. The filtrate contained 2.84 weight percent copper. The reaction dissolved 99.6 weight percent of the copper from the cementation copper.

While certain embodiments and details have been shown for the purpose of illustrating this invention, it will be apparent to those skilled in this art that various changes and modifications may be made herein without departing from the spirit or the scope of the invention.

We claim:

1. A method for recovery of both sulfur and metal values from copper sulfide ores comprising (a) adding a non-sulfide metal containing material to balance the sulfide/recoverable metal mole ratio in the ore to at least 1 to 1, while (b) leaching the metal sulfides at pH of at least 7 in the presence of NH$_3$ and O$_2$, and (c) recovering all sulfur and metal values from the leach solutions.

2. A method as described in claim 1 wherein the nonsulfide metal-containing material is selected from the group consisting of cement copper and scrap copper.

3. A method as described in claim 1 wherein the sulfur values are recovered as sulfuric acid using electrowinning or hydrogen reduction.

4. A method as described in claim 1 wherein the process is carried out at a reaction pressure of from about 90 to about 150 psig and a temperature of from about 90° to about 150° C.

5. A method as described in claim 1 wherein the mol ratio of metal to sulfur is from about 1.0 to 1.5.

* * * * *

UNITED STATES PATENT OFFICE
CERTIFICATE OF CORRECTION

PATENT NO. : 4,030,917
DATED : June 21, 1977
INVENTOR(S) : Anthony G. Fonseca

It is certified that error appears in the above-identified patent and that said Letters Patent are hereby corrected as shown below:

Column 4, line 38, "TI $Cu(NH_3)_{2-4}SO_4 \quad CuSO_4 + NH_3$" should be deleted completely.

Column 5, line 19, "2.52" should be --25.2--.

Signed and Sealed this

Fourth Day of October 1977

[SEAL]

Attest:

RUTH C. MASON
Attesting Officer

LUTRELLE F. PARKER
Acting Commissioner of Patents and Trademarks